July 9, 1946.   E. R. OUIMET   2,403,750
WELT AND METHOD OF MAKING THE SAME
Filed Feb. 16, 1945
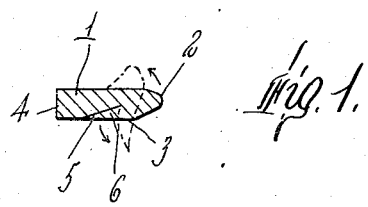
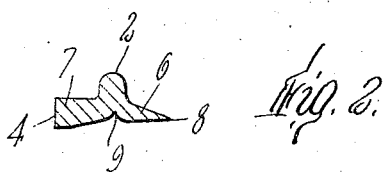
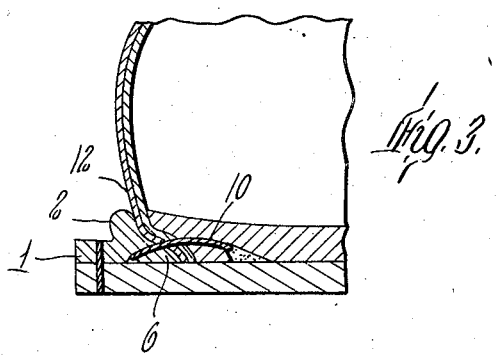
Inventor
Emil R. Ouimet Patented July 9, 1946

2,403,750

UNITED STATES PATENT OFFICE 2,403,750

WELT AND METHOD OF MAKING THE SAME

Emil R. Ouimet, Brockton, Mass.

Application February 16, 1945, Serial No. 578,219

5 Claims. (Cl. 36—78)

This invention relates to welting for shoes and has for an object to provide in a simple and expeditious manner, and without waste, a welt having an upstanding bead for engagement with the outer face of the shoe upper.

A further object is to provide such a welt wherein the bead is without seam and presents the grain face of a leather strip from which the welt is made over the major portion of its outer face.

Still another object is to make such a welt from a strip of flat stock which is not diminished in width by the formation of the bead and may even be increased in width.

A further object is to provide such a welt wherein the thickness at its outer edge is not decreased from that of the strip from which the welt is made, even though the width may not be diminished, or may even be increased.

For a complete understanding of this invention, reference may be had to the accompanying drawing in which Figure 1 is a cross sectional view of the blank strip from which the welt is formed, the strip being cut or channeled inwardly from its lower or flesh face.

Figure 2 is a view similar to Figure 1, but showing the strip bent transversely so as to open up the channel and form the completed welt.

Figure 3 is a detail sectional view through one side of the forepart portion of a shoe showing the welt of Figure 2 incorporated therein.

Referring to Figure 1, a blank strip which may well be of leather, shown at 1, and preferably with its inner edge portion 2 rounded or beveled on the flesh face, or both, depending on the shape which it is desired that the top of the bead may take, is channeled upwardly and inwardly from its under face 3, and preferably starting somewhat inwardly from its outer edge 4 to form a slit 5 which extends toward the edge 2. The blank strip is then folded laterally to bend the edge portion 2 upwardly, as shown in dotted lines in Figure 1 until finally this edge portion 2 forms an upstanding bead while the lip 6 formed by the channeling operation is further folded into substantial alinement with the outer portion 7 of the strip, as shown in Figure 2, this forming the completed welt. It will be noted that the portion 2 forms a bead upstanding between and spaced from the outer edge 4 and the inner edge 8, the latter being formed by the edge of the lip 6. At the same time the opening of the channel produces a recess 9 at the inner end of the channel or slit 5, this recess coming beneath the bead 2. This recess 9 provides a channel in the lower face of the welt which receives the inseam stitches 10 when the welt is incorporated in the shoe as shown in Figure 3. The inseam stitches pass through the lip 6 from the root of the channel 5 and through the top face of the welt close to the juncture between the bead portion 2 and the lip 6, while the bead 2 lies firmly against the upwardly extending outer wall 12 of the shoe upper. The completed welt decreases in thickness, except for the bead, inwardly toward the inner edge 8, but at the outer edge the welt is of the full thickness of the original strip 1 from which the welt was made. With this method of forming up the welt, the over-all width of the welt is not diminished over the width of the strip from which the welt is cut, and it may even be slightly increased in width. This is an important improvement in welts of this description since the narrower the strip from which the welt is made, the longer the strip which can be cut from a given area of leather. Heretofore, so far as I am aware, the formation of a bead in the welt has always resulted in decreasing the width of the completed welt from that of the strip from which it is made, so that a strip of greater width than that of the completed welt has had to be cut from the stock.

The top face of the outer marginal portion 7 and the outer face of the bead, when cut from leather present a continuous grain surface, while the remainder of the bead and the inner portion 6 present other than the grain surface.

From the foregoing description of an embodiment of this invention it should be evident to those skilled in the art that various changes and modifications may be made without departing from the spirit or scope of this invention.

I claim:

1. A welt comprising a strip having an upwardly extending bead between and spaced from its side edges, the marginal portions on either side of said bead tapering in thickness toward the inner edge of the welt.

2. A welt comprising a strip having an upwardly extending bead between and spaced from its side edges, the marginal portions on either side of said bead tapering in thickness toward the inner edge of the welt, the under face of said welt having a recess beneath said bead.

3. A seamless welt having an upstanding bead between its side edges and tapering in thickness on both sides of said bead toward the inner edge of the welt and provided with a recess in its lower face beneath said bead.

4. The method of making a welt which comprises channeling the under face of a blank strip from adjacent one side edge inwardly and upwardly toward the other side edge, and then bending the strip transversely to lift said opposite side edge to form an upstanding bead and bending the lip formed by the channeling operation inwardly and upwardly toward alinement with the outer portion of said strip thereby to form entirely therefrom an inseam attaching flange.

5. The method of making a welt, which comprises channeling inwardly and upwardly from the flesh face of a blank strip of leather from adjacent one side edge toward the rounded opposite edge, and then bending the strip laterally to lift the entire rounded edge portion to form an upstanding bead and continuing to bend the lip in the same direction into substantial alinement with the outer portion of the strip, thereby to form entirely therefrom an inseam attaching flange and a recess in the flesh face of said strip beneath the bead at the end portion of the channel.

EMIL R. OUIMET.